US012056986B2

(12) United States Patent
Kumita et al.

(10) Patent No.: US 12,056,986 B2
(45) Date of Patent: Aug. 6, 2024

(54) INFORMATION PROCESSING SYSTEM AND GAME CONTROL METHOD

(71) Applicant: Universal Entertainment Corporation, Tokyo (JP)

(72) Inventors: Atsushi Kumita, Tokyo (JP); Takahiro Oya, Tokyo (JP); Takenari Matsudaira, Tokyo (JP); Toshikazu Jinnouchi, Tokyo (JP); Muneki Shiraishi, Tokyo (JP); Satoko Baba, Tokyo (JP); Nobuyuki Kawarai, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 71 days.

(21) Appl. No.: 17/333,246

(22) Filed: May 28, 2021

(65) Prior Publication Data

US 2021/0383650 A1 Dec. 9, 2021

(30) Foreign Application Priority Data

Jun. 3, 2020 (JP) ................................ 2020-097278

(51) Int. Cl.
*G07F 17/32* (2006.01)

(52) U.S. Cl.
CPC ...... *G07F 17/3267* (2013.01); *G07F 17/3244* (2013.01)

(58) Field of Classification Search
CPC ......................... G07F 17/3244; G07F 17/3267
USPC ........................................................... 463/20
See application file for complete search history.

(56) References Cited

U.S. PATENT DOCUMENTS

2002/0010018 A1* 1/2002 Lemay .................... G07F 17/32 463/20
2004/0082384 A1* 4/2004 Walker ............... G07F 17/3239 463/40
2004/0209662 A1* 10/2004 Wadleigh ............... G07F 17/32 463/16
2005/0054419 A1* 3/2005 Souza .................... G07F 17/32 463/20

(Continued)

FOREIGN PATENT DOCUMENTS

JP 2017086166 A 5/2017

*Primary Examiner* — James S. McClellan
*Assistant Examiner* — Ross A Williams
(74) *Attorney, Agent, or Firm* — United IP Counselors, LLC; Kenneth M. Fagin

(57) ABSTRACT

An information processing system encourages a player to continue a game even after the end of a special game state. An information processing system includes a storage device. The information processing system executes a normal game, a special game which is triggered based on a result of the normal game and which is more advantageous than the normal game, and an additional game which is executed after the special game and which includes plural stages. When the shift related to the stages occurs so that the progress of the game reaches the final stage of the stages in the additional game, the information processing system provides an additional reward. Meanwhile, when the progress of the game does not reach the final stage in the additional game, the information processing system stores the current state of the stages into the storage device. The additional game resumes from the stored state of the stages in the next execution.

7 Claims, 11 Drawing Sheets

(56) References Cited

U.S. PATENT DOCUMENTS

| | | | | |
|---|---|---|---|---|
| 2006/0160620 | A1* | 7/2006 | Matthews | G07F 17/32 463/42 |
| 2009/0239649 | A1* | 9/2009 | Yoshizawa | G07F 17/32 463/20 |
| 2010/0075751 | A1* | 3/2010 | Garvey | G07F 17/32 463/43 |
| 2011/0118001 | A1* | 5/2011 | Vann | G07F 17/34 463/20 |
| 2015/0031442 | A1* | 1/2015 | Colvin | G07F 17/3244 463/25 |
| 2015/0332544 | A1* | 11/2015 | Kitamura | G07F 17/3213 463/20 |
| 2015/0332545 | A1* | 11/2015 | Kitamura | G07F 17/3213 463/20 |

* cited by examiner

FIG.6

SCENARIO TABLE

| SCENARIO ID | STAGE NO. | ARRANGEMENT LOCATION | MULTIPLYING FACTOR | FINAL STAGE FLAG |
|---|---|---|---|---|
| S001 | 1 | CENTER OF UPPER STAGE | 33 | 0 |
| S001 | 2 | RIGHT OF MIDDLE STAGE | 22 | 0 |
| S001 | 3 | RIGHT OF UPPER STAGE | 11 | 0 |
| S001 | 4 | RIGHT OF LOWER STAGE | 44 | 1 |
| ... | ... | ... | ... | ... |
| S012 | 1 | CENTER OF MIDDLE STAGE | 11 | 0 |
| S012 | 2 | RIGHT OF LOWER STAGE | 22 | 0 |
| S012 | 3 | LEFT OF UPPER STAGE | 22 | 1 |
| ... | ... | ... | ... | ... |

FIG.7

SCENARIO RANDOM DETERMINATION TABLE

| SCENARIO ID | PROBABILITY |
|---|---|
| S001 | 1.5% |
| ··· | ··· |
| S012 | 5% |
| ··· | ··· |

FIG.8

STAGE-STATE MANAGEMENT TABLE

| PLAYER ID | SCENARIO ID | STAGE NO. |
|---|---|---|
| 0002 | S0001 | 3 |
| 0005 | S0005 | 1 |

INFORMATION PROCESSING SYSTEM AND GAME CONTROL METHOD

CROSS-REFERENCE TO RELATED APPLICATION

The present application claims priority from Japanese Patent Application No. 2020-097278, which was filed on Jun. 3, 2020, the disclosure of which is herein incorporated by reference in its entirety.

BACKGROUND OF THE INVENTION

1. Field of the Invention

The present invention relates to an information processing system and a game control method.

2. Description of Related Art

Among games played on stationary gaming machines and smartphones, there have been games in which the shift to a special game state occurs when a predetermined condition is satisfied in the play of a normal game.

Because the probability of acquisition of a large payout is higher in the special game than in the normal game, there is a method of causing a player to expect that the special game state continues as long as possible.

For example, Japanese Laid-Open Patent Publication No. 2017-86166 discloses a method of enhancing the interest on games in a slot game. In the method, the special game state ends on condition that at least one of a first measured number which increases by one each time a first displayed result is determined and a second measured number which increases by one each time a second displayed value is determined increases to two or more. In addition to that, when one of these measured values increases by one, the other is initialized so as to change the timing of the end of the special game state.

However, even if the special game state continues for a long time, there is a concern that the motivation of the player to continue playing games decreases when the special game state is switched to a normal game state again.

BRIEF SUMMARY OF THE INVENTION

An object of the present invention is to provide an information processing system capable of encouraging a player to continue a game even after the end of a special game state.

An information processing system of the present invention includes a storage device and

- a controller programmed to execute a normal game, a special game which is triggered based on a result of the normal game and which is more advantageous than the normal game, and an additional game which is executed after the special game and which includes plural stages, and
- in the additional game, the controller is programmed to execute:
- a process of providing an additional reward when shift related to the stages occurs so that a progress of the additional game reaches a final stage and
- a process of storing a current state of the stages into the storage device so that next execution of the additional game is started from a stored state of the stages, when the progress of the additional game does not reach the final stage.

According to the arrangement above, when the progress of the game does not reach the final stage in the additional game executed after the special game, the current state of the stages is stored. In this regard, the additional game resumes from the stored state of the stages in the next execution. Because of this, even when the progress of the game does not reach the final stage in the additional game, a player is able to continue the play of the additional game from the previous state of the stages by continuing the play of the normal game and triggering the special game. This increases the possibility of encouraging a player to continue the play of the game until the progress of the additional game reaches the final stage so that an additional reward is applied.

The information processing system of the present invention further includes

- a user interface which receives an input from outside, and
- the controller may execute a process of resetting a state of the stages into a first stage when the user interface does not receive an input for a predetermined time.

According to this arrangement, when the user interface does not receive an input for a predetermined time, the controller resets the state of the stages in the additional game into the first stage. Because of this, when a player does not make an input to the user interface for a long time, the state of the stages in the additional game is reset so that the next execution of the additional game is started from the first stage which is the state of the stages after the reset. This increases the possibility of encouraging a player to continue the play of the game until the progress of the additional game reaches the final stage so that an additional reward is provided.

The information processing system of the present invention may be arranged so that the controller is programmed to run application software including the normal game, the special game, and the additional game and to execute the process of resetting when the user interface receives a request of ending the application software.

According to the arrangement above, when the user interface receives the request of ending the application software during the running of the application software, the controller resets the state of the stages in the additional game into the first stage. In other words, a player ends the application software so that the state of the stages in the additional game is reset. When the player starts the application software next time, the first execution of the additional game after the start of the application software is started from the first stage which is the state of the stages after the reset. This increases the possibility of suppressing a player to end the application software before the progress of the additional game reaches the final stage so that an additional reward is provided.

A game control method of the present invention includes:

- a step of executing a normal game, a special game which is triggered based on a result of the normal game and which is more advantageous than the normal game, and an additional game which is executed after the special game and which includes plural stages;
- a step of providing an additional reward when shift related to the stages occurs so that a progress of the additional game reaches a final stage;
- a step of storing a current state of the stages when the progress of the additional game does not reach the final stage; and a step of resuming the additional game from a stored state of the stages in next execution of the additional game when the progress of the additional game does not reach the final stage of the stages in the additional game.

According to the arrangement above, when the progress of the game does not reach the final stage in the additional game executed after the special game, the current state of the stages is stored. In this regard, the additional game resumes from the stored state of the stages in the next execution. Because of this, even when the progress of the game does not reach the final stage in the additional game, a player is able to continue the play of the additional game from the previous state of the stages by continuing the play of the normal game and triggering the special game. This increases the possibility of encouraging a player to continue the play of the game until the progress of the additional game reaches the final stage so that an additional reward is provided.

BRIEF DESCRIPTION OF THE DRAWINGS

FIG. 6 shows a scenario table.

FIG. 7 shows a scenario random determination table.

FIG. 8 shows a stage-state management table.

DETAILED DESCRIPTION OF THE PREFERRED EMBODIMENT

The following will describe an information processing system of the present invention with reference to figures.

The information processing system executes an additional game after the end of a special game, and when symbol combination occurs in one or more lines as a result of the additional game, the information processing system provides a reward based on the total number of lines in each of which symbol combination occurs. When symbol combination does not occur in any line as a result of the additional game, the information processing system accumulatively stores and maintains the progress of the additional game and carries it over to the next execution of the additional game.

Figure 1:
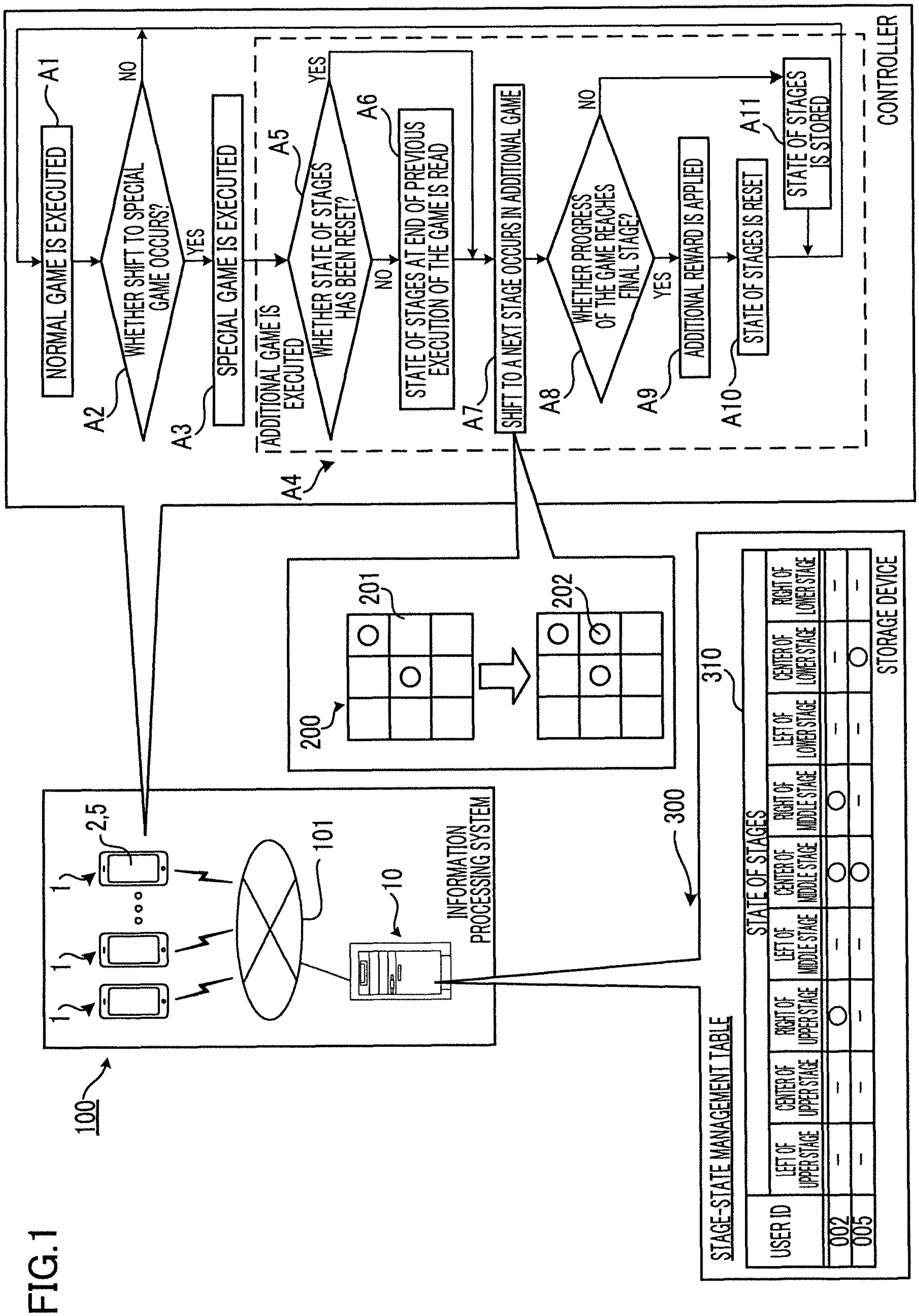
FIG. 1 is an explanatory diagram showing a schematic structure of an information processing system.

Specifically, as shown in FIG. 1, an information processing system 100 includes an information processor 1, a server 10, and a data communication line 101. The information processor 1 is connected to the server 10 in a data-communicable manner via the data communication line 101. It should be noted that the disclosure is not limited to this, and the information processing system 100 may be constituted only by the information processor 1.

While the information processor 1 is a smartphone including a display 2 in the present embodiment, the information processor 1 may be a mobile device or a desktop device. On the display 2, a touch panel 5 which is an input device is provided as a user interface. Examples of the mobile information processor 1 include mobile information devices such as a portable computer, a laptop computer, a tablet PC, a handheld PC, a PDA (Personal Data Assistant), and a smartwatch.

While an example of the data communication line 101 is the Internet, examples of the data communication line 101 may further include LAN (Local Area Network) and WAN (Wide Area Network).

In the information processor 1, shared application software is installed from an application software server or the like corresponding to the OS (Operating System) of the information processor 1. In the present embodiment, a player is allowed to play a game on this application software. The game may be an add-in of the application software. That is, as an additional function of the application software, the game may be provided by the application software server and the server 10, etc., independently from the application software. The application software may allow a player to play plural types of games which are different in effects or rules. The application software may be a web browser.

The information processing system 100 executes a normal game, the special game, and the additional game as games. That is, the application software including the normal game, the special game, and the additional game is executed in the present embodiment. The special game is triggered based on a result of the normal game, and is configured to be more advantageous than the normal game.

The normal game in the present embodiment consumes a predetermined amount of coins (gaming values) owned by a player, and a slot game can be started in response to the consumption of the coins. In this regard, when a predetermined condition is established, the slot game is executed the predetermined number of times as the special game without the consumption of coins.

The coins owned by a player are electronic information. A player accesses the server 10 via the information processor 1, and exchanges cashes to coins in accordance with a payment method specified by the management organization of the slot game. The coins owned by a player are used in various ways. For example, the coins are consumed to obtain an effect influencing on the slot game (as purchase of items), or consumed to change the appearance of an avatar of a player.

The gaming values are not limited to any particular type, and may be electronic money or game points not including valuable information.

The additional game is executed after the special game, and has plural stages. When the shift related to the stages occurs so that the progress of the game reaches the final stage of the stages in the additional game, the information processing system 100 applies an additional reward. When the progress of the game does not reach the final stage of the stages in the additional game, the information processing system 100 stores the state of the stages. In the next execution, the additional game resumes from the stored state of the stages.

In this regard, "stage" indicates a display state in the additional game. In a single execution of the additional game, the information processing system 100 executes a process of shifting the stage displayed at the start of the game to the next stage, and outputs another stage with a different display state.

In the present embodiment, the stage is indicated by the number of symbols which share characteristics from each other and the arrangement of the symbols in a display area. That is, a "state of the stages" indicates the number of symbols and the state of arrangement of symbols. In the additional game, the information processing system 100 accumulatively arranges one symbol for the display area including arrangement parts. In this regard, "shift to a/the next stage" indicates that a symbol is added and arranged in one of arrangement parts where symbols are not arranged. When the symbol is arranged so as to achieve a predetermined arrangement state, the shift to the final stage is carried out. Hereinafter, the symbol will be referred to as an "additional-game symbol" in the following explanations.

In addition to that, "store the state of the stages" and the like indicate that the state of one stage which is output in the additional game is stored. Therefore, when the additional game resumes from the previous state of the stages, the state of the outputted stage in the previous execution of the additional game is input as the current state of the stages. In the present embodiment, the state of the stages is stored in a storage device 300 included in the information processing system 100. When the progress of the game reaches the final stage of the stages in the previous execution of the additional game, the state of the first stage is input. The stages included in the additional game include one first stage and at least one final stage.

In the present embodiment, after the special game, the additional game is executed once, the shift to the next stage is necessarily performed, and an additional-game symbol is accumulatively added. As such, the additional game is accumulatively progressed. In the additional game, the accumulative state of additional-game symbols is stored as the state of the stages and the additional game resumes from the stored accumulative state in the next execution.

As shown in FIG. 1, examples of the additional game include a game like bingo in the present embodiment. In the additional game, the display 2 of the information processor 1 shows an additional-game display area 200 having nine cells 201 forming a matrix of three rows and three columns. For each cell 201, one additional-game symbol 202 is arrangeable. In the additional game, additional-game symbols 202 are arranged in the additional-game display area 200 so that the state of the stages is progressed. It should be noted that the disclosure is not limited to this. For example, the additional-game display area 200 may be formed as a matrix of four rows and four columns or a matrix of five rows and five columns, or may be differently formed in shape. In addition to that, the additional game is not necessarily a bingo game, and may be a card game or a board game, etc.

In the present embodiment, the first stage is a state in which no additional-game symbol 202 is arranged in cells 201 of the additional-game display area 200. However, the disclosure is not limited to this. For example, the first stage may be a state in which an additional-game symbol 202 is arranged in one or more cells 201 of the additional-game display area 200. In addition to that, the final stage is a state in which additional-game symbols 202 are arranged in all of three cells 201 forming at least one of a vertical line, a lateral line, and an inclined line in the additional-game display area 200. When the progress of the game reaches the final stage in the additional game, a reward is provided. There are 512 patterns (9th power of 2) at most to arrange additional-game symbols 202 in the additional-game display area 200 having three rows and three columns. The additional game may have all of these patterns as the stages or may have some of them as the stages. As such, the state of the stages is indicated by additional-game symbols 202 arranged in the additional-game display area 200 and by the state of arrangement of the additional-game symbols 202. Hereinafter, the state of the stages may be referred to as an "additional-game symbol arrangement state".

As described above, the information processing system 100 executes the additional game once after the special game. In the additional game, the information processing system 100 performs the shift to the next stage each time the additional game is executed once. To be more specific, when the additional game is started after the special game, the display 2 of the information processor 1 shows the additional-game display area 200. At this time, the state of the outputted stage in the previous execution of the additional game or the state of the first stage is displayed as the current state of the stages in the additional-game display area 200. Subsequently, among nine cells 201 in the additional-game display area 200, an additional-game symbol 202 is arranged in one of the cells 201 in which additional-game symbols 202 are not arranged. The arranged additional-game symbol 202 is accumulatively stored in the storage device 300, and maintained until the next execution of the additional game.

When the shift related to the stages occurs so that the progress of the game reaches the final stage in the additional game, an additional reward is provided. The additional reward is not particularly limited, but is preferably related to the gaming values consumed in the normal game. For example, each of the stages is weighted, and the gaming values, an amount of which is obtained by multiplying the consumed gaming values in the normal game by a value obtained by summing up the weight of all stages from the first stage to the final stage, may be awarded as the additional reward.

The information processing system 100 executes the normal game (A1), and then executes a process of determining whether the shift to the special game occurs based on a result of the normal game (A2). If it is determined that the shift to the special game does not occur (NO in A2), the information processing system 100 performs the shift to the step A1. Meanwhile, if it is determined that the shift to the special game occurs (YES in A2), the information processing system 100 executes the special game (A3).

After the execution of the special game, the information processing system 100 executes the additional game (A4). After the start of the additional game, the information processing system 100 firstly executes a process of determining whether the state of the stages in the additional game has been reset (A5). In this regard, "to reset the state of the stages" indicates that the additional game is started from the first stage of the stages in the next execution. Whether the additional game is started from the first stage in the next execution may be determined based on, for example, whether the stored state of the stages in the storage device 300 is the first stage. In addition to that, for example, it may be determined based on a flag that is switched on at the time of resetting. Although not illustrated, a process of resetting the state of the stages is executed before the additional game is executed for the first time and after the execution of the application software.

If it is determined that the state of the stages has not been reset (No in A5), the information processing system 100 executes a process of reading the state of the stages from the storage device 300 (A6), reflects the state of the stages at the end of the previous execution of the additional game into the current state of the stages, and then executes a process of shifting the stage of the additional game to the next stage (A7).

Meanwhile, when it is determined that the state of the stages has been reset (YES in A5), the information processing system 100 executes a process of performing the shift to the next stage in the additional game (A7) without executing a process of reading the state of the stages from the storage device 300 (A6). In the present embodiment, the shift to the next stage occurs each time the additional game is executed. However, the shift to a stage directly or indirectly subsequent to the next stage may occur.

In the present embodiment, each of the stages to which the game is shifted is determined in advance in the additional game. That is, in which cell 201 an additional-game symbol 202 is arranged in each of the stages from the first stage to the final stage is determined at a predetermined timing. Therefore, the positions to which additional-game symbols 202 are added in the additional-game display area 200 and the order of arrangement of the additional-game symbols 202 are determined in advance. The predetermined timing is not particularly limited as long as it is before the state of the first stage is displayed on the display 2 of the information processor 1. For example, the predetermined timing may be a timing when a process of resetting the state of the stages is performed. In addition to that, each of the stages to which the game is shifted may be determined based on a random number and the like each time the step A7 is executed.

After the execution of the step A7, the information processing system 100 executes a process of determining whether the progress of the additional game reaches the final stage (A8). If it is determined that the progress of the additional game has reached the final stage (YES in A8), the information processing system 100 executes a process of providing an additional reward (A9) and then executes a process of resetting the state of the stages (A10). That is, the information processing system 100 executes a process of indicating that the additional game is started from the first stage in the next execution. For example, the information processing system 100 may change the state of the stage stored in the storage device 300 to the state of the first stage or may switch on a flag indicating that the additional game is started from the first stage in the next execution.

Meanwhile, if it is determined that the progress of the additional game has not reached the final stage (NO in A8), the information processing system 100 executes a process of storing the current state of the stages into the storage device 300 (A11). Because of this, the information processing system 100 accumulatively stores the state of the stages of the additional game, and maintains this state of the stages of the additional game until the next execution of the additional game. The state of the stages may be managed in a table 310 of a relational database in the present embodiment or may be managed in a text format such as XML (Extensible Markup Language) and JSON (Java Script Object Notation). While the storage device 300 configured to store the state of the stages is in the server 10 in the present embodiment, the storage device 300 may be in the information processor 1.

In addition to the above, as the information processing system 100 including the program above executes the processes (A1) to (A11), a game control method in which the processes (A1) to (A11) are executed by the information processing system 100 (computer) is embodied. In other words, the information processing system 100 includes a plurality of processing units configured to execute the processes (A1) to (A11), respectively. While the descriptions below deal with the information processing system 100 including the information processor 1 and the server 10, processes and operations of the information processor 1 can be interpreted as those of a program or the game control method. Further, the processes executed by the information processing system 100 may be executed only in the information processor 1, or only a function as a database may be implemented in the server 10. That is, the processes and operations of the information processing system 100 may be paraphrased as an invention of the information processor 1.

As such, the information processing system 100 executes the normal game, the special game which is triggered based on a result of the normal game and which is more advantageous than the normal game, and the additional game which is executed after the special game and which includes the plural stages. When the shift related to the stages occurs so that the progress of the game reaches the final stage in the additional game, the information processing system 100 provides an additional reward. Meanwhile, when the progress of the game does not reach the final stage in the additional game, the information processing system 100 stores the state of the stages in the storage device 300. In this regard, the additional game resumes from the stored state of the stages in the next execution.

According to the arrangement above, when the progress of the game does not reach the final stage in the additional game executed after the special game, the current state of the stages is stored. In this regard, the additional game resumes from the stored state of the stages in the next execution. Because of this, even when the progress of the game does not reach the final stage in the additional game, a player is able to continue the play of the additional game from the previous state of the stages by continuing the play of the normal game and triggering the special game. This increases the possibility of encouraging a player to continue the play of the game until the progress of the additional game reaches the final stage so that an additional reward is provided.

Figure 2:
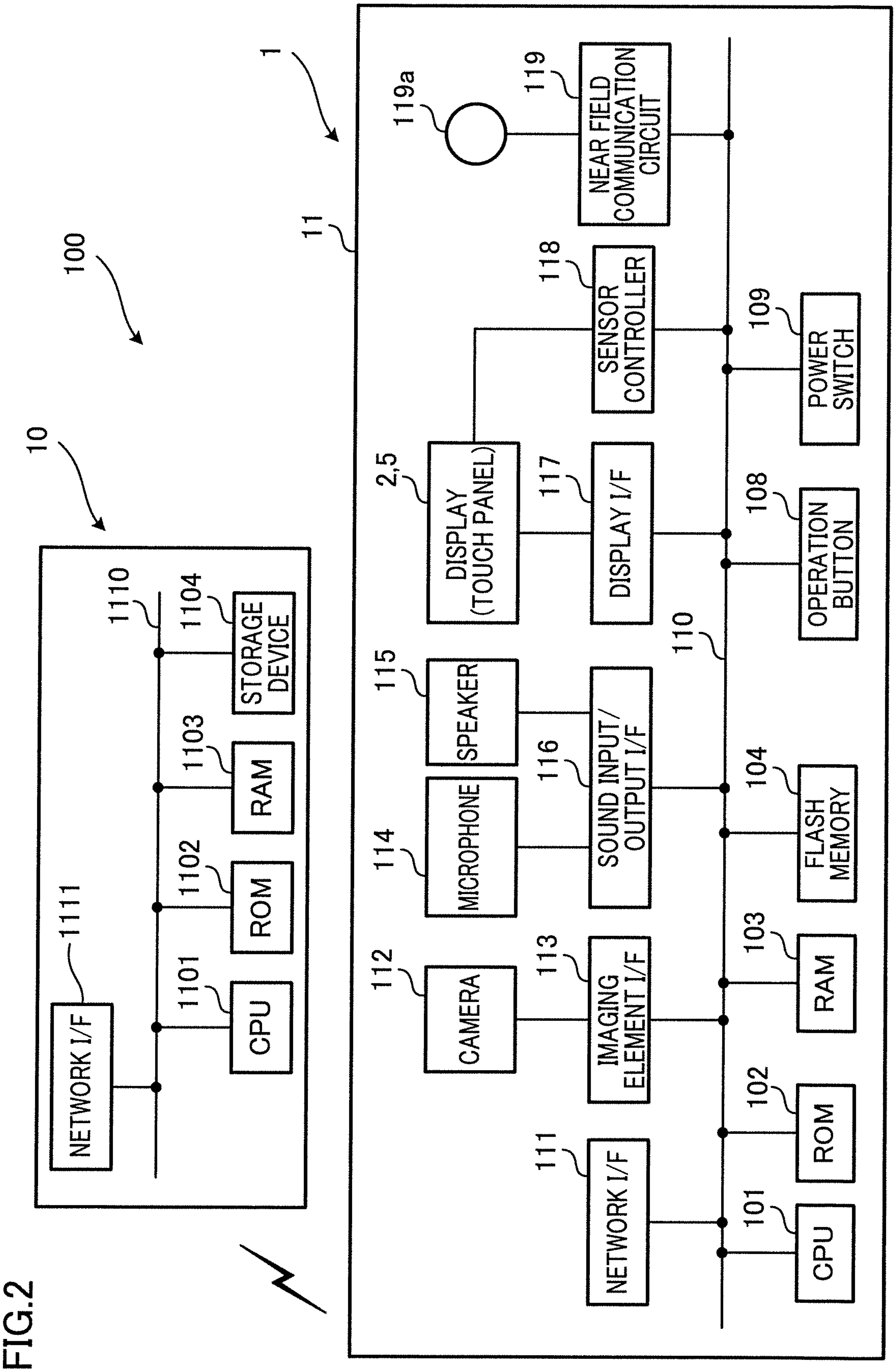
FIG. 2 is a block diagram showing the electrical configuration of the information processing system.

As shown in FIG. 2, the information processor 1 includes, in the housing 11, a CPU 101, a ROM 102, a RAM 103, a flash memory 104, an operation button 108, a power switch 109, a bus line 110, a network I/F 111, a camera 112, an imaging element I/F 113, a microphone 114, a speaker 115, a sound input/output I/F 116, a display I/F 117, a sensor controller 118, a near field communication circuit 119, and an antenna 119*a* of the near field communication circuit 119. In the front surface of the housing 11, a display 2 with a touch panel 5 is embedded.

Further, the server 10 is a so-called computer including a CPU 1101, a ROM 1102, a RAM 1103, a storage device 1104 such as a hard disk drive and the like, a bus line 1110, and a network I/F 1111.

The CPU (Central Processing Unit) 101 controls the entire operation of the information processor 1 (i.e., corresponds to a controller). The CPU 1101 functions as a main structure of the controller in the server 10, and controls the entire operation of the server 10. The CPUs 101 and 1101 therefore function as controllers which control the entire operation of the information processing system 100. The ROM (Read Only Memory) 102 and the ROM 1102 store programs used for driving the CPU 101 and the CPU 1101, such as an IPL (Initial Program Loader).

The RAM (Random Access Memory) 103 and the RAM 1103 are used as a work area of the CPU 101 and the CPU 1101. The operation button 108 is used for, for example, initial setting of the information processor 1. The power switch 109 is used for turning on/off the power source of the information processor 1.

The flash memory 104 functioning as a memory is a non-volatile computer readable medium which stores the game program, a program for communication, and plural sets of data such as image data and sound data. The storage device 1104 is a non-volatile computer readable medium which functions as a database, and stores game data of each of information processors 1. In response to a request from the game program in the information processor 1, the server 10 returns as needed a response referring to the database in the storage device 1104.

For example, the flash memory 104 stores various programs which include the game program executed by the CPU 101 functioning as a controller and various data used in the various programs. In other words, the game program causes the information processor 1 which is a computer including the CPU 101 and the flash memory 104 to execute processes included in the various programs. When the information processor 1 is interpreted as the information processing system 100, the flash memory 104 and the storage device 1104 store the various programs including the game program executed by the CPUs 101 and 1101 functioning as controllers and the various data used in the various programs. In other words, the game program causes the information processor 1 which is the information processing system 100 including the CPUs 101 and 1101, the flash memory 104, and the storage device 1104 to execute the processes included in the various programs. As such, the processes and operations of the information processor 1 are interpretable as a program, a non-volatile computer readable medium which stores programs, or a game control method, etc.

The data and program in the flash memory 104 and the storage device 1104 may be stored in advance at the stage of factory shipment, or may be downloaded from an unillustrated server or the like via communication means and stored. The communication means may be an interactive communication passage such as the Internet and a cable TV, or may be one-way broadcasting. Alternatively, the data and program stored in the memory flash memory 104 and the storage device 1104 may be stored in a recording medium such as a floppy disk, a CD-ROM, a DVD-ROM, an MO (optical magnetic disc), and a flash memory, and may be read out from such a recording medium as needed and installed.

The network I/F (Interface) 111 and the network I/F 1111 are each an interface for data communications with the server 10 and the like. The data communications uses a communication network such as the internet. The camera 112 is a built-in image capturing means which captures an image of an object to obtain image data under the control of the CPU 101. The imaging element I/F 113 is a circuit for controlling the camera 112. The microphone 114 is a built-in sound collection means to which sound is input. The sound input/output I/F 116 is a circuit for processing input and output of a sound signal between the microphone 114 and the speaker 115 under the control of the CPU 101. The display I/F 117 is a circuit for sending image data to the display 2 under the control of the CPU 101. The sensor controller 118 is a circuit for receiving an input from the touch panel 5 of the display 2. The near field communication circuit 119 is a communication circuit based on NFC (Near Field Communication; Registered Trademark), Bluetooth (Registered Trademark), or the like. The bus line 110 and the bus line 1110 are each an address bus, a data bus, or the like for electrically connecting the components such as the CPU 101 and the CPU 1101.

Figure 3:
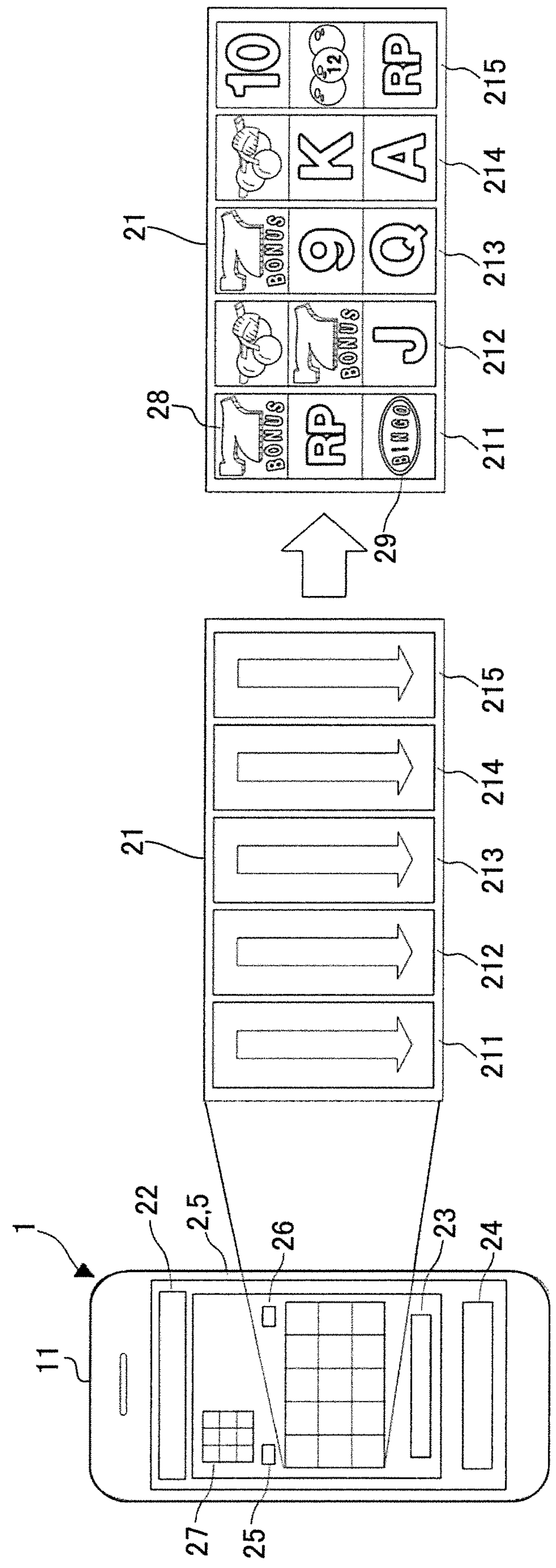
FIG. 3 shows an example display screen of a normal game.

The following describes a slot game screen displayed on the display 2 of the information processor 1 in the present embodiment with reference to FIG. 3.

In the normal game and the special game, the display 2 of the information processor 1 shows a slot game screen as shown in FIG. 3. On the slot game screen, a symbol display area 21, a game information display area 22, an effect display area 23, an operation display area 24, a left-segment display area 25, a right-segment display area 26, and an additional-game symbol arrangement state display area 27 are displayed. The game information display area 22 is an area for displaying, e.g., information (the current number of owned coins, etc.) which increases or decreases in accordance with the execution of the slot game. The effect display area 23 is an area for displaying a game-related moving image, a game-related still image, and a game-related message, etc., in accordance with the progress of the slot game.

The symbol display area 21 has a display area (columns 211 to 215) in which five video reels are respectively scrolled and stopped. Plural symbols are aligned in each video reel. When the video reels are stopped, three symbols are displayed in each of the columns 211 to 215. As such, a state in which symbols are stopped and displayed in the symbol display area 21 is referred to as a "rearrangement". While fifteen symbols are rearranged to form a matrix of five columns and three rows in the symbol display area 21 in the present embodiment, the disclosure is not limited to this.

The operation display area 24 is an input area operated by a player in order to progress the slot game. Although not illustrated, the operation display area 24 displays a spin button for making an input to start the slot game and a bet button for determining, by a touch input, the number of coins betted on the normal game.

The left-segment display area 25 displays a left-segment value. The left-segment value is used as a value for determining a payout in the special game and as the remaining number of times of execution of the slot game in the special game. The right-segment display area 26 displays a right-segment value. The right-segment value is used as a determination value for determining whether the shift to the special game occurs and as a value for determining a payout of the slot game in the special game.

The additional-game symbol arrangement state display area 27 displays the stored state of the stages. That is, in which cell 201 an additional-game symbol 202 has been arranged in the additional-game display area 200 as a result of the previous execution of the additional game is shown. Because of this, a player knows the current state of the stages in the additional game even when the additional game is not executed. The screens during the additional game are detailed later.

The normal game or the special game is executed in response to an input to the operation display area 24, and symbols are varied (image of scrolling reels is displayed) in the symbol display area 21 and then stopped. Subsequently, a win is achieved and a reward (e.g., a payout and an item which are advantageous for a player) is provided when the rearranged symbols in the symbol display area 21 achieve a predetermined combination. This series of operations is referred to as a "unit game".

The following describes a configuration of symbol arrays which are displayed in the respective columns 211 to 214 of the symbol display area 21 and which are included in the five video reels. In this regard, the video reels are stored in the RAM 103 or the RAM 1103.

Plural symbols are aligned in each of the five video reels. Examples of types of symbols aligned in each video reel include normal symbols such as "12", "CHERRY", "RP", "A", "K", "Q", "J", "10", and "9" and a "BONUS" symbol 28 and a "BINGO" symbol 29 both of which trigger the special game. A "WILD" symbol is an almighty symbol which is arranged only in the special game and which can substitute for any other symbol. The "BINGO" symbol 29 is a scatter symbol which does not need to form a line to achieve a win, and whether a win of "BINGO" is achieved is determined based on the number of the rearranged "BINGO" symbols 29 in the symbol display area 21.

The winning determination in the present embodiment is a payline type in which one area is selected from among the upper, middle, and lower stages of columns and in which whether a win is achieved is determined based on a symbol combination of rearranged symbols on a payline formed in the selected areas. For example, there are a payline formed of areas on the middle stage of the columns and a payline formed of an area on the upper stage of the column 211, an area on the middle stage of the column 212, an area on the lower stage of the column 213, an area on the middle stage of the column 214, and an area on the upper stage of the column 215. When three or more symbols of the same type are successively rearranged on such a payline across the columns 211 to 215, a win is achieved and a payout is awarded. While there are thirty paylines in the present embodiment in regard to the number of the paylines, the number of the paylines may be set in any number such as fifty. In the present embodiment, all of thirty paylines are activated in a single unit game.

In this regard, the winning determination may be a "LEFT TO RIGHT" type. In the "LEFT TO RIGHT" type, assume that fifteen symbols are rearranged in the symbol display area 21. In this case, when a predetermined number or more (3 to 5 in the present embodiment) symbols of the same type are successively arranged so as to form a lateral line across the columns 211 to 215 of the symbol display area 21 among the fifteen symbols, a win is achieved and a payout is awarded as a reward.

The RAM 103 or RAM 1103 stores a paytable of the slot game. The paytable of the slot game defines payout amounts of coins paid out (payout) with respect to the combinations of symbols (arrangement patterns of symbols) with which a win is achieved. In the slot game, scroll of five video reels is stopped, and a win is achieved when three or more symbols of the same type are successively rearranged on a payline across the columns 211 to 215 in the symbol display area 21. In accordance with a type of the win, a payout is awarded as a reward. In this regard, when BONUS is won in the normal game, the special game is triggered. In addition to that, when BINGO is won in the normal game, a randomly-determined right-segment value is displayed in the right-segment display area 26. When numbers of all digits of a right-segment value are identical with each other, the special game is triggered.

Figure 4:
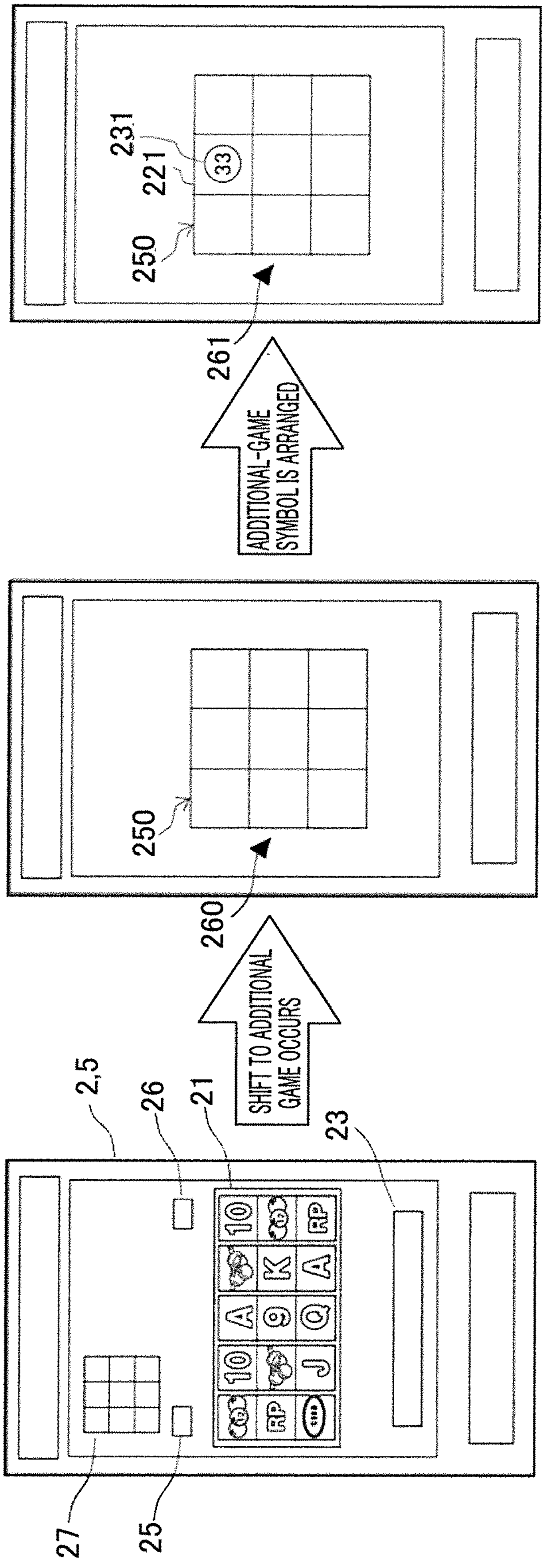
FIG. 4 shows an example display screen of an additional game.
Figure 5:
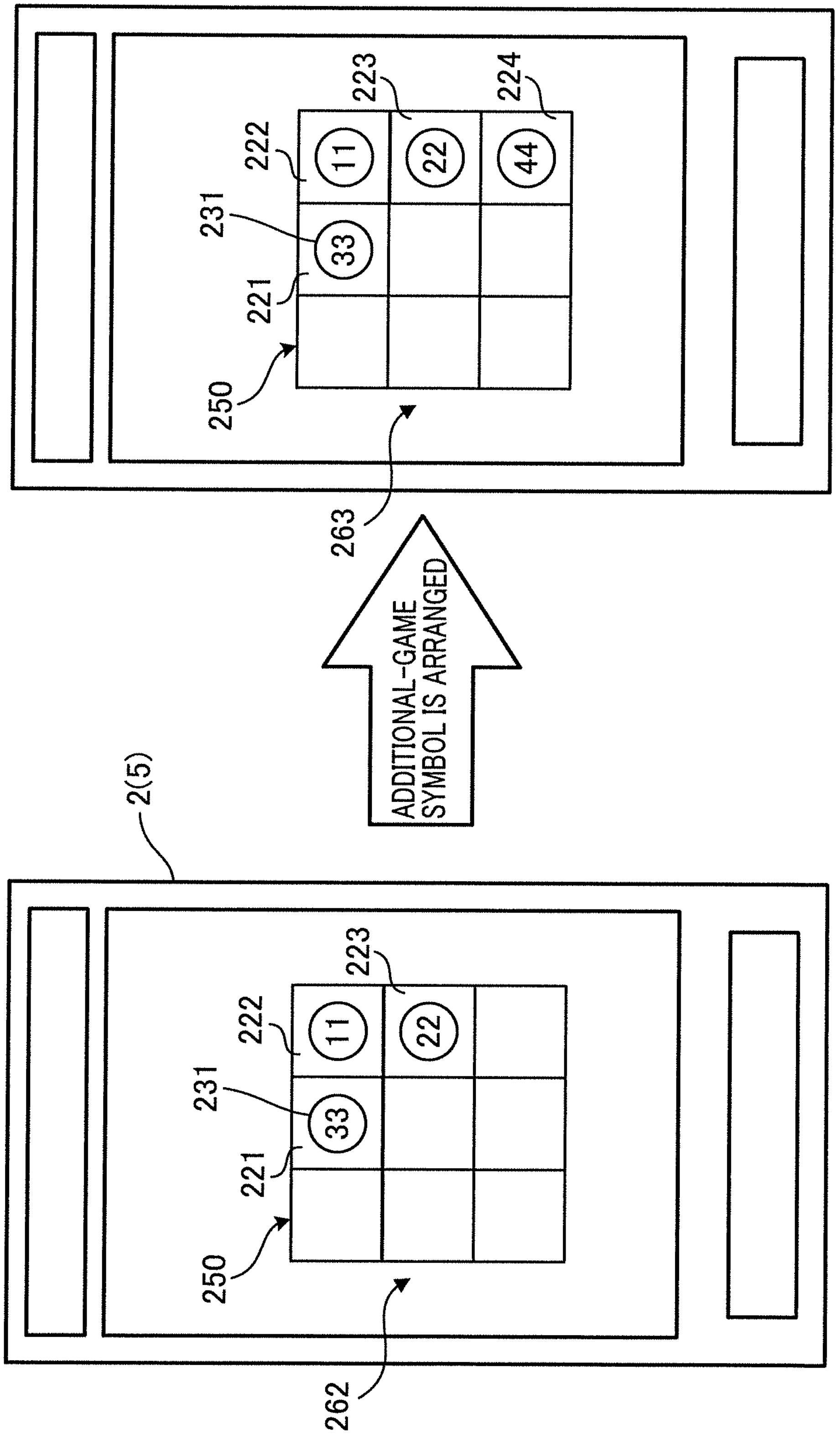
FIG. 5 shows an example display screen of the additional game in a final stage.

The following describes image display in the additional game with reference to FIG. 4 and FIG. 5. As shown in FIG. 4, the display 2 shows an additional game screen in the additional game which is started after the end of the special game. On the additional game screen, an additional-game display area 250 is displayed. The additional-game display area 250 includes nine cells 221 forming a matrix of three rows and three columns.

As shown in FIG. 4, when the additional game is started, the first stage is displayed in a state 260 in which no additional-game symbol 231 is arranged in the cells 221 of the additional-game display area 250. That is, the game is started in a state in which all cells 221 are blank in the additional game after the process of resetting. Subsequently, an additional-game symbol 231 at the center of which a 2-digit integer is displayed is arranged in one of the blank cells 221 of the additional-game display area 250. Then the additional game ends. Therefore, because all of nine cells 221 are blank when the additional game is started from the first stage, an additional-game symbol 231 is arranged in one of the cells 221 of the additional-game display area 221. Then the additional game ends. In the next execution, the additional game resumes from the state of the stages at the end of the previous execution of the additional game (i.e., from the state 261). As such, the state of the stages at each end of the additional game is accumulatively stored, and maintained until the next execution of the additional game. In addition to that, the arrangement state of additional-game symbols 231 in the additional-game display area 250 at the end of the latest execution of the additional game is shown in the additional-game symbol arrangement state display area 27 during the normal game and the special game before the next execution of the additional game.

The following describes a case where the additional game resumes from one state, with reference to FIG. 5. As shown in FIG. 5, when the additional game resumes from the state of one stage, a state 262 in which additional-game symbols 231 are arranged in the cells 221, 222, and 223 of the additional-game display area 250 is displayed at the start of the additional game. This state is the stored state of the stages at the end of the previous execution of the additional game.

In the example of FIG. 5, the additional-game display area 250 at the start of the additional game displays a state in which additional-game symbols 231 are arranged in the cell 221 at the center of the upper stage, the cell 222 at the right part of the upper stage, and the cell 223 at the right part of the middle stage (i.e., an additional-game start state 262). Subsequently, an additional-game symbol 231 is further arranged in the cell 224 at the right part of the lower stage in the additional-game display area 250 in the additional game. As a result, a state 263 in which three additional-game symbols 231 are successively arranged as to form a line at the right column of the additional-game display area 250 is achieved. As such, the final stage is displayed as a state in which additional-game symbols 231 are arranged in all of three cells 231 forming at least one of a vertical line, a lateral line, and an inclined line in the additional-game display area 250. When the progress of the game reaches the final stage in the additional game, a reward is provided and the state of the stages is reset. That is, the additional game is started from the first stage in the next execution (see FIG. 4).

Additional-game symbols 231 have circular contours, and are identical to each other in that the above-described integer is displayed in each circular contour. In the present embodiment, the integer in each additional-game symbol is selected one from among 11, 22, 33, 44, 55, 66, 77, 88, and 99. In this regard, a reward is determined based on a total value of integers of the additional-game symbols forming a line. To be more specific, gaming values an amount of which is obtained by multiplying a total value of integers of the additional-game symbols forming a line by an average bet amount are awarded as a reward. In this regard, an "average bet amount" indicates an average value of bet amounts during all executions of the normal game after the state of the stages is reset and before the progress of the additional game reaches the final stage.

The following describes a scenario table with reference to FIG. 6. The scenario table is stored in the storage device 1104 of the server 10, and stores scenarios. The scenarios indicate plural sets of the following items: an order of arranging additional-game symbols from the first stage to the final stage in the additional game; arrangement locations of the additional-game symbols; and integers displayed at the respective additional-game symbols. The scenario table includes a "scenario ID" column, a "stage No." column, an "arrangement location" column, a "multiplying factor" column, and a "final stage flag" column. The "scenario ID"

indicates a value identifying each scenario. The "stage No." indicates an order of arranging additional-game symbols into the additional-game display area 50. The "arrangement location" indicates in which cell 221 each additional-game symbol is arranged among nine cells 221 of the additional-game display area 250. The "multiplying factor" indicates an integer displayed at the center of each additional-game symbol arranged in the additional-game display area 250. The "final stage flag" indicates whether the progress of the additional game reaches the final stage immediately after a corresponding additional-game symbols arranged in the row. The scenario table is referred in a process of reading the additional-game symbol arrangement state, a process of arranging additional-game symbols 231 into the additional-game display area 250, and a process of determining whether the progress of the additional game reaches the final stage.

The following describes a scenario random determination table with reference to FIG. 7. The scenario random determination table is stored in the storage device 1104 of the server 10, and stores a probability that each scenario is selected. The scenario random determination table includes a "scenario ID" column and a "probability" column. The "scenario ID" indicates a value identifying each scenario. The "probability" indicates a probability that each scenario is selected in the additional game, and the "probability" column is used when the server 10 randomly determines a scenario ID from the scenario random determination table. The scenario random determination table is referred in a process of determining a scenario in the additional game.

The following describes a stage-state management table with reference to FIG. 8. The stage-state management table is stored in the storage device 1104 of the server 10, and stores the state of the stages in the additional game executed by each information processor 1. Because of the stage-state management table, the state of the stages in the additional game can be accumulatively stored. The stage-state management table includes a "player ID" column, a "scenario ID" column, and a "stage No." column. The "player ID" indicates a value identifying each player who logs in the application software. The "scenario ID" indicates a value identifying each scenario of the additional game. The "stage No." indicates the number of additional-game symbols which have already been arranged in the additional-game display area 250. Each player ID is associated with a scenario ID and a stage No., so that which state of the stages the player is in is shown. The stage-state management table is referred in a process of determining whether the additional-game symbol arrangement state is the first stage and a process of reading the additional-game symbol arrangement state. The stage-state management table is updated in a process of resetting the additional-game symbol arrangement state and a process of storing the additional-game symbol arrangement state. In this regard, to "reset the additional-game symbol arrangement state" indicates that the additional-game symbol arrangement state is changed to the first stage.

In the present embodiment, the following items are determined in advance: the order of arranging additional-game symbols 231 from the first stage to the final stage in the additional game; arrangement locations of the additional-game symbols 231; and multiplying factors displayed at the respective additional-game symbols 231. However, the disclosure is not limited to this. Alternatively, the following items may be randomly determined each time the shift to the next stage occurs: arrangement locations of the additional-game symbols 231; and integers displayed at the respective additional-game symbols 231.

Figure 9:
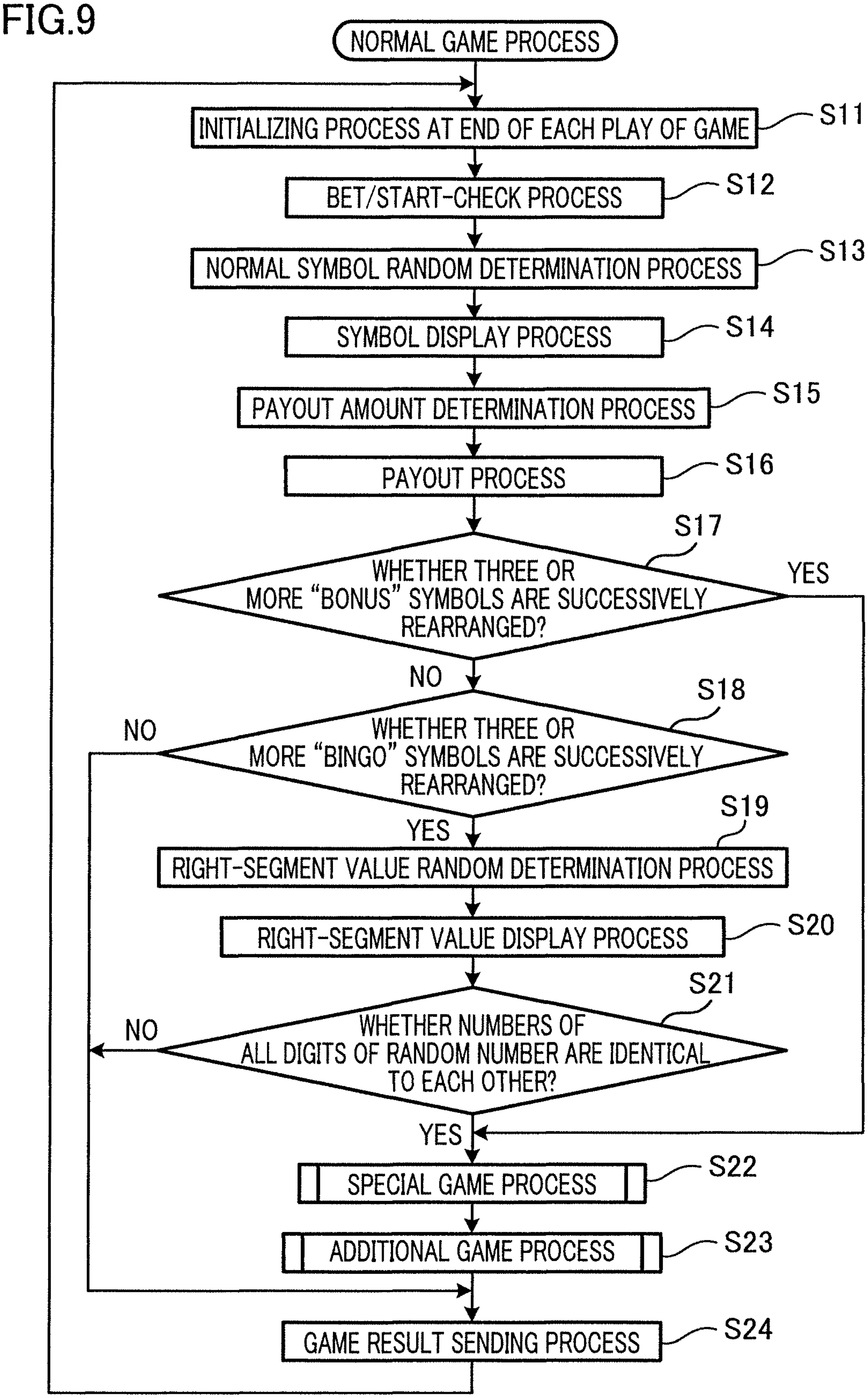
FIG. 9 is a flowchart of a normal game process.

The following describes a normal game control process with reference to FIG. 9.

To begin with, the CPU 101 executes an initializing process at the end of each play of the game, in order to start the slot game (S11). For example, this process clears data in a working area of the RAM 103, which becomes unnecessary at the end of each play of the unit game, e.g., a payline activated in the previous execution of the unit game, the value of a bet amount counter in a bet amount storage area, and symbols to be displayed on the symbol display area 21 as a result of random determination.

The CPU 101 then executes a bet/start-check process (S12). In this process, all of thirty paylines are activated. By a touch input such as pressing of the bet button of the operation display area 24, the number of coins betted on each payline is determined.

In the step S12, the CPU 101 determines whether a touch input has been made to the spin button of the operation display area 24. If a touch input has been made to the spin button, the shift to the step S13 occurs so that the slot game progresses.

The CPU 101 then executes a normal symbol random determination process (S13). In this process, by using the video reels, to-be-stopped symbols are randomly selected from symbols provided on the video reels. The to-be-stopped symbols are data of five symbols to be displayed in the middle stages of the columns 211 to 215 of the symbol display area 21, out of the symbols forming each video reel. In this way, fifteen symbols displayed in the symbol display area 21 are determined.

The CPU 101 then stores the determined five to-be-stopped symbols into a symbol storing area provided in the RAM 103.

Subsequently, the CPU 101 executes a symbol display process (S14). In this process, the five to-be-stopped symbols which have been determined in the step S13 are rearranged in the middle stages of the columns 211 to 215 of the symbol display area 21.

Subsequently, the CPU 101 executes a payout amount determination process (S15). In this process, whether three or more symbols of the same type are successively rearranged on the payline across the columns 211 to 215 so that a win is achieved is determined based on the paytable stored in the RAM 103. When a win is achieved, a payout is awarded in accordance with a type of the win. The awarded payout is stored in a payout amount storage area provided in the RAM 103.

Subsequently, the CPU 101 executes a payout process (S16). In this process, the CPU 101 adds the value stored in the payout amount storage area to a value stored in a coin counter provided in the RAM 103.

Subsequently, the CPU 101 executes a process of determining whether a win of "BONUS" is achieved (S17). If it is determined that the "BONUS" win has been achieved (YES in S17), the shift to a special game process occurs (S21). As described later, this special game process allows a player to play the slot game seven times without the consumption of coins.

Meanwhile, if it is determined that the "BONUS" win has not been achieved (NO in S17), the CPU 101 executes a process of determining whether a win of "BINGO" is achieved (S18). If it is determined that the "BINGO" win has been achieved (YES in S18), the CPU 101 executes a right-segment value random determination process (S19). In this process, the CPU 101 generates a right-segment value which is a three-digit random number and then stores the right-segment value into a right-segment storage area provided in RAM 103. In this regard, the right-segment value is used as a determination value for determining whether the shift to the special game occurs.

The CPU 101 then executes a right-segment value display process (S20). In this process, the CPU 101 displays the right-segment value into the right-segment display area 26.

Subsequently, the CPU 101 executes a process of determining whether numbers of all digits of the right-segment value are identical to each other (S21).

If it is determined that numbers of all digits of the right-segment value are identical to each other (YES in S21), the CPU 101 performs the shift to the special game process (S22). For example, when the right-segment value is "333", the CPU 101 executes the step S22. After the step S22 is executed, the CPU 101 performs the shift to an additional game process (S23). The additional game process will be described later with reference to FIG. 10.

If it is not determined that numbers of all digits of the right-segment value are not identical to each other (YES in S21), if it is determined that the "BINGO" win has not been achieved (NO in S18), or after the execution of the step S23, the CPU 101 executes a game result sending process (S24). In this process, results of a single unit game are sent to the server 10 as game result information. The results are as follows: a bet amount which has been determined in the step S12 (i.e., the value stored in the bet amount counter); the to-be-stopped symbols which have been determined in the step S13 (i.e., fifteen symbols displayed in the symbol display area 21); the type of the win which has been achieved in the step S15 (this type may be a type of losing); and the value which is stored in the coin counter and which has been updated in the step S16 (i.e., an amount of owned coins). In this regard, the step S24 is executed so that the information processor 1 and the server 10 share, e.g., the progress and result of the slot game, in order to prevent cheating and unfairness and to backup the progress of the slot game executed in the information processor 1. Therefore, the step S24 may be executed after the execution of a predetermined process, executed at predetermined time intervals, or executed at a timing set by a player or an administrator of the server 10.

After the execution of the step S24, the routine returns to the step S11.

Figure 10:
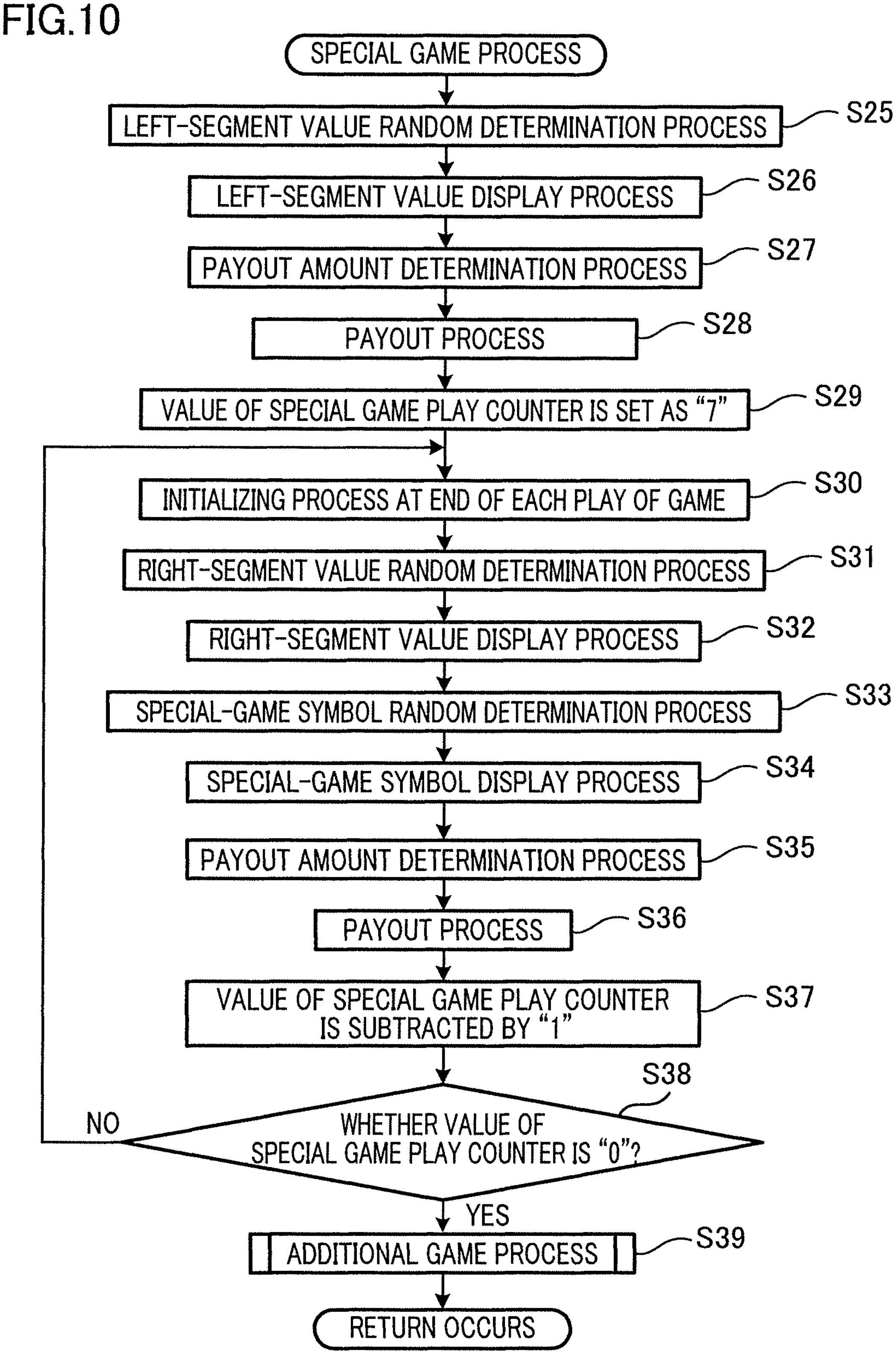
FIG. 10 is a flowchart of a special game process.

The following describes the special game process with reference to FIG. 10. This special game process is executed if the CPU 101 determines that the "BONUS" win has been achieved in the step S17. Alternatively, the special game process is executed if it is determined that the "BINGO" win has been achieved in the step S18 and that numbers of all digits of the right-segment value are identical to each other in the step S21. In this regard, the bet amount in the normal game triggering the special game remains the same in the special game process.

To begin with, the CPU 101 executes a left-segment value random determination process (S25). In this process, the CPU 101 generates a left-segment value which is a two-digit random number, a three-digit random number, or a four-digit random number and then stores the left-segment value into a left-segment storage area provided in RAM 103. In this regard, the left-segment value is used as a value for determining a payout in the special game.

The CPU 101 then executes a left-segment value display process (S26). In this process, the CPU 101 displays the left-segment value into the left-segment display area 25. The left-segment display area 25 displays a three-digit value. When the left-segment value is four digits long, the left-segment display area 25 displays the last three digits of the left-segment value. When the left-segment value is four digits long, a value displayed in the left-segment display area 25 is different from the left-segment value. However, by virtue of an effect, a player can understand that the actual left-segment value is four digits long. To be more specific, an effect is executed in the left-segment display area 25 so that the value increases from "0" and stops at the value identical to the left-segment value. When the left-segment value is four digits long, an effect is executed so that "0" is displayed after "999" and the value increases from "0" again and stops at the value identical to the last three digits of the left-segment value. This allows a player to understand that the left segment value is four digits long.

Subsequently, the CPU 101 executes a payout amount determination process (S27). In this process, a value obtained by multiplying the bet amount by the left segment value is awarded as a payout. The awarded payout is stored in the payout amount storage area.

The CPU 101 then executes a payout process (S28). In this process, the CPU 101 adds the value stored in the payout amount storage area to the value stored in the coin counter.

Subsequently, the CPU 101 executes a process of setting a value stored in a special game play counter as "7" (S29). During the special game, the left-segment display area 25 displays the value stored in the special game play counter.

The CPU 101 then executes an initializing process at the end of each play of the game in the same manner as in the step S11 of the normal game, in order to start the slot game in the special game (S30). In addition to that, the CPU 101 determines whether a touch input has been made to the spin button of the operation display area 24. If a touch input has been made to the spin button, the shift to the step S31 occurs so that the slot game progresses.

Subsequently, the CPU 101 executes a right-segment value random determination process (S31). In this process, the CPU 101 generates a right-segment value which is a one-digit random number or a two-digit random number and then stores the right-segment value into the right-segment storage area. In this regard, the right-segment value is used as a value for determining a payout of the slot game in the special game.

The CPU 101 then executes a right-segment value display process (S32). In this process, the CPU 101 displays the right-segment value into the right-segment display area 26.

The CPU 101 then executes a special-game symbol random determination process (S33). In this process, by using the video reels, to-be-stopped symbols are randomly selected from symbols provided on the video reels in the same manner as in the step S13.

The CPU 101 then executes a special-game symbol display process (S34). In this process, the scroll of the symbol arrays of the video reels starts in the same manner as in the step S13. After a predetermined time elapses, the five to-be-stopped symbols which have been selected in the special-game symbol random determination process in the step S33 are rearranged one by one in the middle stages of the columns 211 to 215 of the symbol display area 21. In the upper and lower stages of each of the columns 211 to 215 of the symbol display area 21, symbols arranged above and below the to-be-stopped symbols in the symbol arrays are rearranged.

Subsequently, the CPU 101 executes a payout amount determination process (S35). In this process, whether three or more symbols (including a "WILD" symbol) of the same type are successively rearranged on a payline across the columns 211 to 215 and a win is achieved is determined based on the paytable. If a win has been achieved, the value obtained by multiplying a payout corresponding to a type of the win by a bet amount per payline (i.e., a value obtained by dividing the bet amount by the number of paylines) and by the value stored in the right-segment storage area is calculated. This obtained value is calculated for each payline achieving a win, and the total of those values is awarded as a payout. The awarded payout is stored in the payout amount storage area.

Subsequently, the CPU 101 executes a payout process (S36). In this process, the CPU 101 adds the value stored in the payout amount storage area to the value stored in the coin counter.

The CPU 101 then executes a process of subtracting "1" from the value stored in the special game play counter (S37).

Subsequently, the CPU 101 executes a process of determining whether the value stored in the special game play counter is "0" (S38). If it is determined that the value stored in the special game play counter is not "0" (NO in S38), the CPU 101 performs the return to the step S30.

Meanwhile, if it is determined that the value stored in the special game play counter is "0" (YES in S38), the CPU 101 performs the shift to the additional game process (S39). After the execution of the step S39, the routine returns to processes of the normal game occurs.

Figure 11:
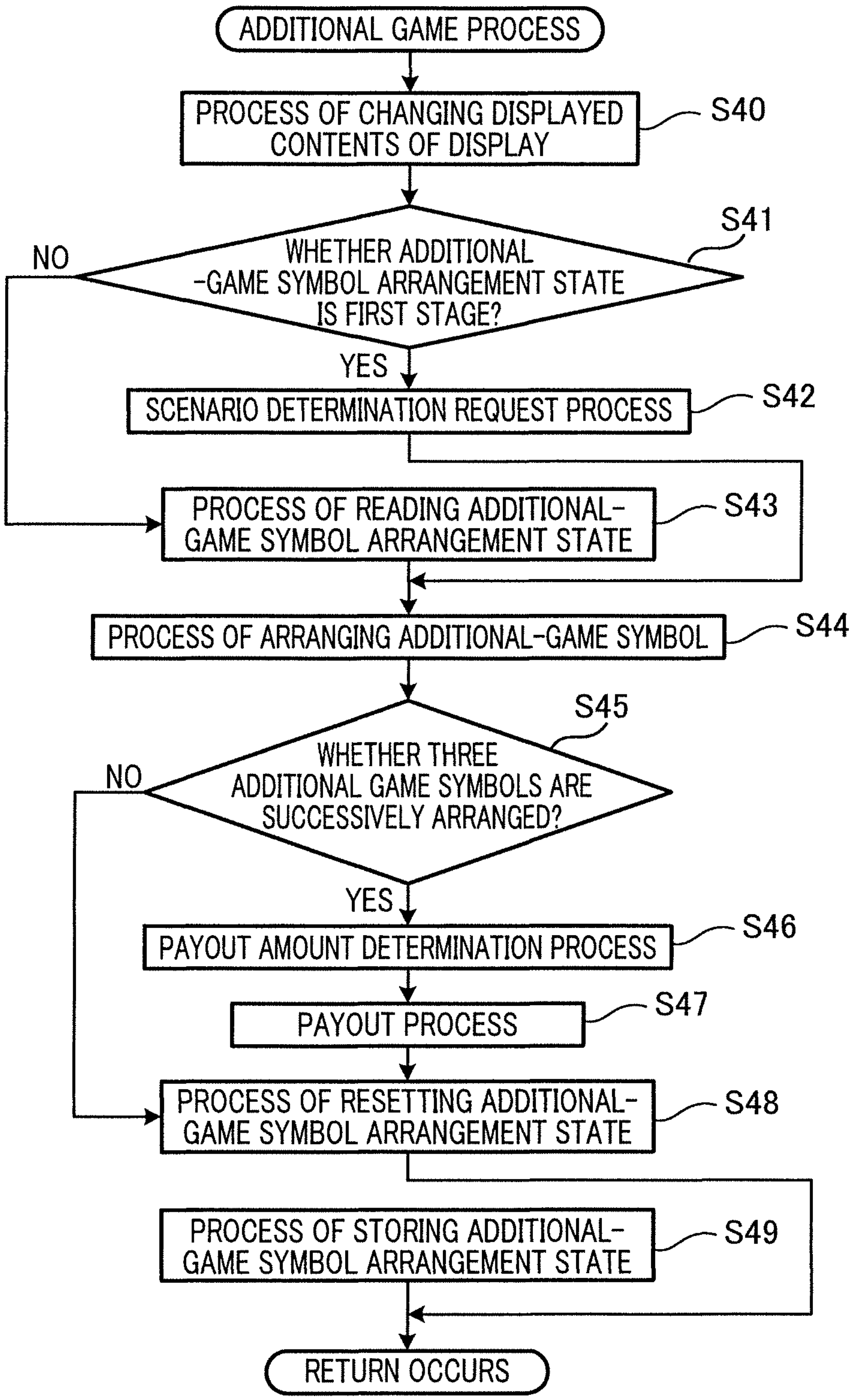
FIG. 11 is a flowchart of an additional game process.

The following describes processes of the additional game with reference to FIG. 11. In this regard, the description of the processes of the additional game is given as a specific explanation of the process (A4) of the additional game with reference to FIG. 1 in accordance with the description of the present embodiment.

To begin with, the CPU 101 executes a process of changing the displayed contents of the display 2 at the start of the additional game (S40).

Subsequently, the CPU 101 executes a process of determining whether the additional-game symbol arrangement state is the first stage of the stages (S41). In the step S41, the CPU 101 executes a process of acquiring, from the server 10, a signal indicating the number of arranged additional-game symbols 231, i.e., the number of additional-game symbols 231 arranged in the additional-game symbol display area 250 at the end of the previous execution of the game. The CPU 101 determines whether the additional-game symbol arrangement state is the first stage based on the number of arranged additional-game symbols, which is included in the arranged additional-game symbol number signal indicating the number of arranged additional-game symbols. The step S41 and a process of the server 10 (i.e., a request response process in a step S59 described later) in relation to the step S41 correspond to the step A5 (see FIG. 1), i.e., the process of determining whether the state of the stages has been reset.

If it is determined that the additional-game symbol arrangement state is the first stage (YES in S41), the CPU 101 executes a scenario determination request process (S42). The CPU 101 sends a request of determining a scenario of the additional game to the server 10. The scenario is determined in the server 10 based on the scenario random determination table (see FIG. 7). Because of this process, the following items are determined in advance: the order of arranging additional-game symbols 231 from the first stage to the final stage in the additional game; arrangement locations of the additional-game symbols 231; and multiplying factors displayed at the respective additional-game symbols 231.

Meanwhile, if it is determined that the additional-game symbol arrangement state is not the first stage (NO in S41), the CPU 101 executes a process of reading the additional-game symbol arrangement state (S43). In the step S43, the CPU 101 executes a process of acquiring, from the server 10, a signal which includes stage-state information indicating the state of the stages at the end of the previous execution of the game and of reflecting and displaying the stage-state information into the additional-game symbol display area 250 (see FIG. 5). In this regard, a stage-state information signal which is sent in return from the server 10 includes arrangement locations of additional-game symbols 231 (see FIG. 5) in the additional-game symbol display area 250 and multiplying factors displayed at the respective additional-game symbols 231. That is, the CPU 101 determines arrangement locations of additional-game symbols 231 and the type (multiplying factor) of each of the additional-game symbols 231 based on the stage-state information. The step S43 and a process of the server 10 (i.e., the request response process in the step S59 described later) in relation to the step S43 correspond to the step A6 (see FIG. 1), i.e., the process of reading the state of the stages at the end of the previous execution of the game.

After the execution of the step S42 or the step S43, the CPU 101 executes a process of arranging an additional-game symbol (S44). In the step S44, the CPU 101 executes a process of acquiring, from the server 10, a signal including next stage-state information indicating the state of the stage after an additional-game symbol 231 has been additionally arranged and of reflecting and displaying the next stage-state information into the additional-game symbol display area 250 (see FIG. 5). In this regard, a next stage-state information signal which is sent in return from the server 10 includes an arrangement location of an additional-game symbol 231 (see FIG. 5) which is added in the additional-game symbol display area 250 and a multiplying factor displayed at the additional-game symbol 231. That is, the CPU 101 determines an arrangement location of an additional-game symbol 231 which is additionally arranged and the type (multiplying factor) of the additional-game symbol 231 based on the next stage-state information. The step S44 and a process of the server 10 (i.e., the request response process in the step S59 described later) in relation to the step S44 correspond to the step A7 (see FIG. 1), i.e., the process of performing the shift to the next stage in the additional game.

Subsequently, the CPU 101 executes a process of determining whether three additional-game symbols are successively arranged (S45). In the step S45, the CPU 101 acquires, from the server 10, a signal including final stage determination information which indicates whether the progress of the additional game reaches the final stage. The CPU 101 determines whether three additional-game symbols 231 are successively arranged in the additional-game display area 250 based on the final stage determination information included in the signal above. The step S45 and a process of the server 10 (i.e., the request response process in the step S59 described later) in relation to the step S45 correspond to the step A8 (see FIG. 1), i.e., the process of determining whether the progress of the game reaches the final stage.

If it is determined that three additional-game symbols are successively arranged (YES in S45), the CPU 101 executes a payout amount determination process (S46). In this process, a value obtained by multiplying the total value of integers displayed at the three additional-game symbols, which are successively arranged, by an average bet amount is awarded as a payout. The awarded payout is stored in the payout amount storage area.

Subsequently, the CPU 101 executes a payout process (S47). The CPU 101 adds the value stored in the payout amount storage area to the value stored in the coin counter. The processes of the steps S40 and S41 correspond to the step A9 (see FIG. 1), i.e., the process of providing an additional reward.

Subsequently, the CPU 101 executes a process of resetting the additional-game symbol arrangement state (S48). In the step S48, the CPU 101 sends a request of resetting the state of the stages to the server 10. The server 10, which is configured to manage the state of the stages, resets the state of the stages in response to this request as described later. Because of this, in the next execution, the additional game is started from the first stage in which no additional-game symbol 231 is arranged in the additional-game display area 250. In the step S48, the CPU 101 resets the average bet amount. The step S48 and a process of the server 10 (i.e., a state reset process in a step S60 described later) in relation to the step S48 correspond to the step A10 (see FIG. 1), i.e., the process of resetting the state of the stages.

Meanwhile, if it is determined that three additional-game symbols are not successively arranged (NO in S45), the CPU 101 executes a process of storing the additional-game symbol arrangement state (S49). In this process, the CPU 101 sends a request of storing the additional-game symbol arrangement state after the execution of the step S44 to the server 10. This allows the state of the stages of the additional game to be accumulatively stored in the storage device 1104 and to be maintained until the next execution of the additional game. The step S49 and a process of the server 10 (i.e., a stage-state increment process in a step S57 described later) in relation to the step S49 correspond to the step A11 (see FIG. 1), i.e., the process of storing the current state of the stages.

After the execution of the step S48 or the step S49, the CPU 101 ends the additional game and executes the step S24. In this regard, the additional-game symbol arrangement state stored in an additional-game symbol arrangement state storage area is shown in the additional-game symbol arrangement state display area 27 of the display 2 during the normal game and the special game before the next execution of the additional game.

Figure 12:
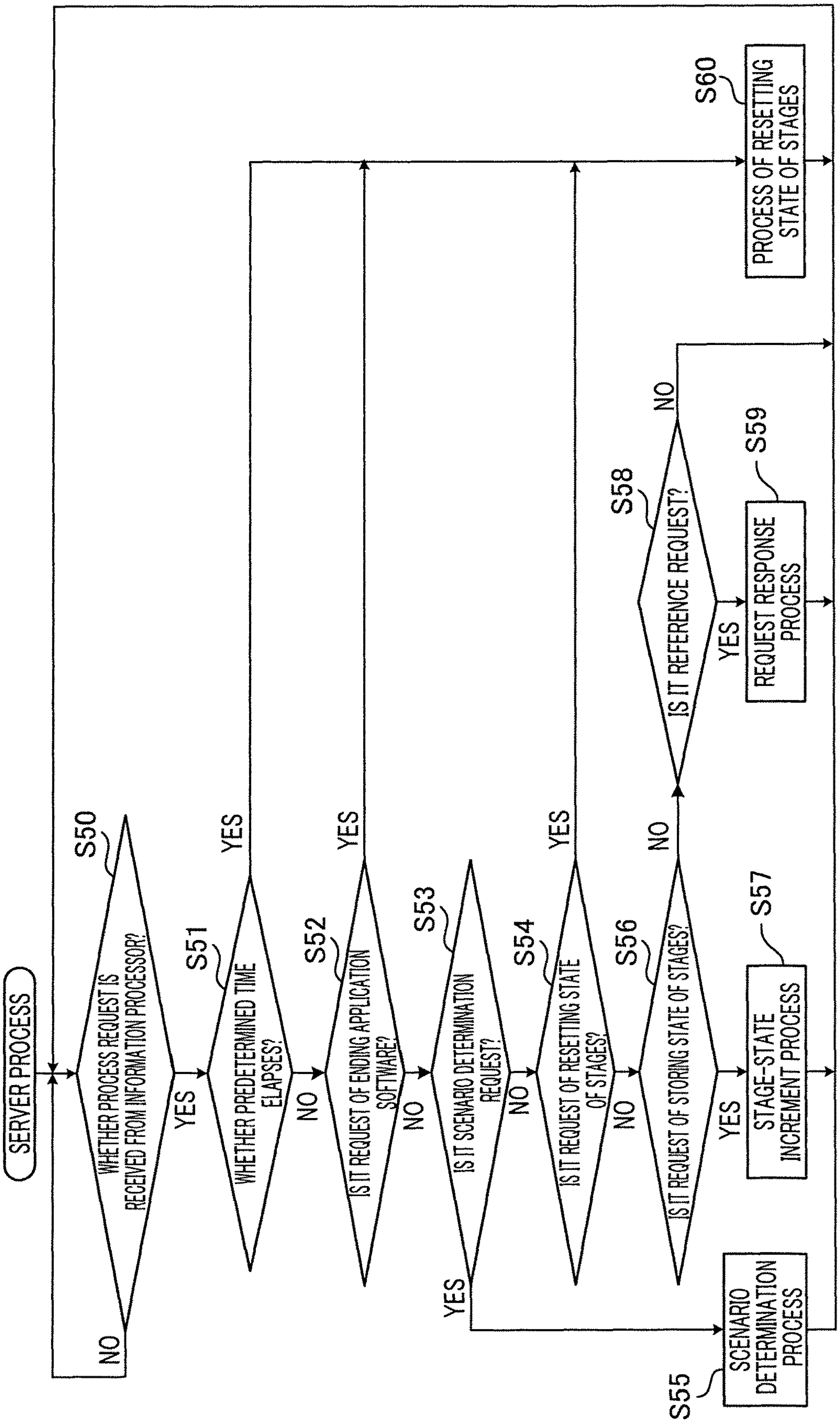
FIG. 12 is a flowchart of a server process.

The following describes processes executed by the CPU 1101 of the server 10 with reference to FIG. 12.

The CPU 1101 determines whether any process request is received from the information processor 1 is determined (S50). If it is determined that any process request from the information processor 1 has not been received (NO in S50), the CPU 1101 continues the step S50.

If it is determined that a process request from the information processor 1 has been received (YES in S50), the CPU 1101 determines whether a predetermined time elapses from the previous receipt of a process request (S51). To be more specific, the CPU 1101 determines whether a predetermined time elapses from a last update time (not illustrated) associated with the player ID.

If it is determined that a predetermined time has not elapsed from the previous receipt of a process request (NO in S51), the CPU 1101 determines whether the received request from the information processor 1 is a request of ending the application software (S52).

If it has been determined that the request from the information processor 1 is not the request of ending the application software (No in S52), the CPU 1101 determines whether the request from the information processor 1 is a scenario determination request (S53). The process in which the information processor 1 sends the scenario determination request to the CPU 1101 is executed in the step S42 of the additional game process (see FIG. 11).

If it has been determined that the request from the information processor 1 is not the scenario determination request (NO in S53), the CPU 1101 determines whether the request from the information processor 1 is a request of resetting the state of the stages (S54). The process in which the information processor 1 sends the request of resetting the state of the stages to the CPU 1101 is executed in the step S48 of the additional game process (see FIG. 11).

If it has been determined that the request from the information processor 1 is the scenario determination process (YES in S53), the CPU 1101 executes a scenario determination process (S55). In the step S55, the CPU 1101 refers to the scenario determination table (see FIG. 7) and selects one scenario ID by the random determination based on probabilities associated with respective scenario IDs. In addition to that, the CPU 1101 refers to the stage-state management table (see FIG. 8) in the step S55. If a player ID included in the scenario determination request is in the "player ID" column, a storage area which corresponds to this player ID and which is in the "scenario ID column" is updated. Meanwhile, if the player ID is not in the "player ID" column, a new set of data is generated.

If it is determined that the request from the information processor 1 is the request of resetting the state of the stages (YES in S54), if it is determined that a predetermined time has elapsed from the previous receipt of a process request (YES in S51), or if it is determined that the request from the information processor 1 is the request of ending the application software (YES in S52), the CPU 1101 executes a process of resetting the state of the stages (S60). In this process, the CPU 1101 refers to the stage-state management table (see FIG. 8). If a player ID included in the request of ending the application software is in the "player ID" column, a storage area which corresponds to the player ID and which is in the "stage No." column is updated as "0". After the execution of the step S60, the CPU 1101 performs the return to the step S50.

In this regard, when the touch panel included in the information processor 1 does not receive, e.g., an input causing the slot game to progress for a predetermined time, the result of the step S51 is determined as YES.

According to this arrangement, when the user interface does not receive an input for a predetermined time, the CPU 1101 resets the state of the stages in the additional game into the first stage. Because of this, when a player does not make an input to the user interface for a long time, the state of the stages in the additional game is reset so that the next execution of the additional game is started from the first stage which is the state of the stages after the reset. This increases the possibility of encouraging a player to continue the play of the game until the progress of the additional game reaches the final stage so that an additional reward is applied.

According to the arrangement above, when the CPU 1101 receives the request of ending the application software while running the application software, the state of the stages in the application software is reset to be the first stage. In other words, a player ends the application software so that the state of the stages in the additional game is reset. When the player starts the application software next time, the first execution of the additional game after the start of the application software is started from the first stage which is the state of the stages after the reset. This increases the possibility of suppressing a player to end the application software before the progress of the additional game reaches the final stage so that an additional reward is applied.

If it has been determined that the request from the information processor 1 is not the request of resetting the state of the stages (NO in S54), the CPU 1101 determines whether the request from the information processor 1 is a request of storing the current state of the stages (S56). The process in which the information processor 1 sends the request of storing the current state of the stages to the CPU 1101 is executed in the step S49 of the additional game process (see FIG. 11).

Meanwhile, if it has been determined that the request from the information processor 1 is the request of storing the current state of the stages (YES in S56), the CPU 1101 executes a stage-state increment process (S57). In this process, the CPU 1101 refers to the stage-state management table (see FIG. 8). If a player ID and a scenario ID which are included in the request of storing the current state of the stages are respectively in the "player ID" column and the "scenario ID" column, a value in a storage area which corresponds to the player ID and the scenario ID and which is in the "stage No." column is incremented by "1". This allows the state of the stages of the additional game to be accumulatively stored and to be maintained until the next execution of the additional game. After the execution of the step S57, the CPU 1101 performs the return to the step S50.

If it has been determined that the request from the information processor 1 is not the request of storing the current state of the stages (NO in S56), the server 10 determines whether the request from the information processor 1 is a reference request (S58). If it has been determined that the request from the information processor 1 is not the reference request (NO in S58), the routine returns to the step S50 occurs.

Meanwhile, if it has been determined that the request from the information processor 1 is the reference request (YES in S58), the CPU 1101 sends a signal corresponding to the content of the reference request to the information processor 1.

If the reference request in the step S58 is related to the step S41, the CPU 1101 refers to the stage-state management table (see FIG. 8). If a player ID included in the reference request of the step S58 is in the "player ID" column, the CPU 1101 generates information regarding the number of arranged additional-game symbols based on a value stored in a storage area which corresponds to the player ID and which is in the "stage No." column. The CPU 1101 sends an arranged additional-game symbol number signal including the information regarding the number of arranged additional-game symbols to the information processor 1.

If the reference process in the step S58 is related to the step S43, the CPU 1101 refers to the stage-state management table (see FIG. 8). If a player ID included in the reference process in the step S58 is in the "player ID" column, the CPU 1101 acquires a value stored in a storage area which corresponds to the player ID and which is in the "scenario ID" column. Subsequently, the CPU 1101 refers to the scenario table (see FIG. 6). The CPU 1101 generates stage-state information based on values which are respectively stored in storage areas which correspond to the acquired scenario ID and which are respectively of the "arrangement location" column and the "multiplying factor" column. At this time, the CPU 1101 refers to the storage areas of the "arrangement location" column and the "multiplying factor" column in relation to the stage numbers from the stage No. "1" to the stage number having been acquired in the step S41. The CPU 1101 sends a stage-state signal including the stage-state information to the information processor 1.

If the reference request in the step S58 is related to the step S44, the CPU 1101 refers to the scenario table (see FIG. 6). If a scenario ID and a stage No. which are included in the reference request of the step S58 are respectively in the "scenario ID" column and the "stage No." column, next stage-state information is generated based on values in storage areas both of which correspond to the scenario ID and the stage No. and which are respectively of the "arrangement location" column and the "multiplying factor" column. Subsequently, the CPU 1101 sends a next stage-state information signal including the next stage-state information to the information processor 1.

If the reference request in the step S58 is related to the step S45, the CPU 1101 refers to the scenario table (see FIG. 6). If a scenario ID and a stage No. which are included in the reference request of the step S58 are respectively in the "scenario ID" column and the "stage No." column, final stage determination information is generated based on a value stored in a storage area which corresponds to the scenario ID and the stage No. and which is in the "final stage flag" column. Subsequently, the CPU 1101 sends a final stage determination signal including the final stage determination information to the information processor 1.

In this regard, examples of a process request determined in the step S50 include a request of storing game result information such as following items which have been sent to the server 10 in the step S24: a bet amount which has been determined in the step S12; to-be-stopped symbols which have been determined in the step S13; the type of the win which has been achieved in the step S15; and the value which has been updated in the step S16 and which is stored in the coin counter. Although not illustrated, when a request from the information processor 1 is sent, the CPU 1101 updates a last update time associated with a player ID.

Embodiments of the present invention thus described above solely serve as specific examples of the present invention, and are not to limit the scope of the present invention. The specific structures and the like are suitably modifiable. Further, the effects described in the embodiments of the present invention described in the above embodiment are no more than examples of preferable effects brought about by the present invention, and the effects of the present invention are not limited to those described hereinabove.

Further, the detailed description above is mainly focused on characteristics of the present invention to for the sake of easier understanding. The present invention is not limited to the above embodiments, and is applicable to diversity of other embodiments. Further, the terms and phraseology used in the present specification are adopted solely to provide specific illustration of the present invention, and in no case should the scope of the present invention be limited by such terms and phraseology. Further, it will be obvious for those skilled in the art that the other structures, systems, methods or the like are possible, within the spirit of the present invention described in this specification. The description of claims therefore shall encompass structures equivalent to the present invention, unless otherwise such structures are regarded as to depart from the spirit and scope of the present invention. Further, the abstract is provided to allow, through a simple investigation, quick analysis of the technical features and essences of the present invention by an intellectual property office, a general public institution, or one skilled in the art who is not fully familiarized with patent and legal or professional terminology. It is therefore not an intention of the abstract to limit the scope of the present invention which shall be construed on the basis of the description of the claims. To fully understand the object and effects of the present invention, it is strongly encouraged to sufficiently refer to disclosures of documents already made available.

The detailed description of the present invention provided hereinabove includes a process executed on a computer. The above descriptions and expressions are provided to allow the one skilled in the art to most efficiently understand the present invention. A process performed in or by respective steps yielding one result or blocks with a predetermined processing function described in the present specification shall be understood as a process with no self-contradiction. Further, the electrical or magnetic signal is transmitted/received and written in the respective steps or blocks. It should be noted that such a signal is expressed in the form of bit, value, symbol, text, terms, number, or the like solely for the sake of convenience. Although the present specification occasionally personifies the processes carried out in the steps or blocks, these processes are essentially executed by various devices. Further, the other structures necessary for the steps or blocks are obvious from the above descriptions.

What is claimed is:

1. An information processing system, comprising a storage device containing therein data defining a plurality of predefined stage-progression scenarios and state-of-stages data, a display, and a controller programmed to execute on the display 1) a normal game; 2) a special game which is more advantageous to a player than the normal game; and 3) an additional game which indicates graphically, via a progressive sequence of images corresponding to a progressive sequence of stages, the player's advancement toward achievement of a predetermined special-game objective comprising triggering of a special-game execution period a predetermined number of times, with execution of the additional game including randomly selecting from the storage device one of the plurality of predefined stage-progression scenarios, at the beginning of a given sequence of stages, that will define the progressive sequence of stages that will be followed until completion of the given sequence of stages, wherein the controller is programmed to execute the normal game in response to consumption of gaming value and to execute the special game when the special-game execution period is triggered based on a result of the normal game;

wherein the controller is programmed to execute the additional game in connection with each iteration of the special-game execution period;

wherein the controller is programmed such that, in each successive execution of the additional game, one stage of the progressive sequence of stages is initially displayed on the display in accordance with the selected one of the plurality of predefined stage-progression scenarios, which display of said one stage then shifts to display of another stage of the progressive sequence of stages in accordance with the selected one of the plurality of predefined stage-progression scenarios;

wherein the controller is programmed to determine whether said another stage of the progressive sequence of stages is a final stage of the progressive sequence of stages, which final stage signals achievement of the predetermined special-game objective;

wherein the controller is programmed 1) to provide an additional-game payout; 2) to randomly select from the storage device another one of the plurality of predefined stage-progression scenarios; and 3) to reset the state-of-stages data in the storage device to correspond to a first, initial stage of said another one of the plurality of predefined stage-progression scenarios if said another stage is the final stage of the progressive sequence of stages defined by said one of the plurality of predefined stage-progression scenarios, whereby said one stage of the progressive sequence of stages that is initially displayed in the next successive execution of the additional game will be the first, initial stage of the progressive sequence of stages defined by said another one of the plurality of predefined stage-progression scenarios; and wherein the controller is programmed to set and save the state-of-stages data in the storage device to correspond to said another stage if said another stage is not the final stage of the progressive sequence of stages defined by said one of the plurality of predefined stage-progression scenarios, whereby said one stage of the progressive sequence of stages that is initially displayed in the next successive execution of the additional game will be said another stage.

2. The information processing system according to claim 1, wherein the controller is programmed to execute the additional game at the end of each instance of the special-game execution period.

3. The information processing system according to claim 1, wherein the controller is programmed to execute a plurality of special-game unit games during each iteration of the special-game execution period.

4. The information processing system of claim 1, wherein each successive stage in the progressive sequence of stages comprises an accumulative display of symbols on the display.

5. The information processing system of claim 4, wherein the final stage comprises at least some of the symbols forming a predetermined geometric pattern.

6. The information processing system of claim 1, wherein the controller is programmed to execute at least one normal game during a subsequent normal-game execution period after a given special-game execution period concludes and before the special game is executed once again due to another special-game execution period being triggered.

7. The information processing system of claim 1, wherein the additional-game payout is provided only when said another stage is the final stage of the progressive sequence of stages defined by said one of the plurality of predefined stage-progression scenarios, and not when said another stage is other than the final stage.

* * * * *